(12) United States Patent
Kirklin (10) Patent No.: US 11,760,145 B1
(45) Date of Patent: Sep. 19, 2023

(54) BALL JOINT

(71) Applicant: Super ATV, LLC, Madison, IN (US)

(72) Inventor: Aaron Kirklin, Charlestown, IN (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 18/159,691

(22) Filed: Jan. 26, 2023

Related U.S. Application Data (60) Provisional application No. 63/269,360, filed on Mar. 15, 2022.

(51) Int. Cl.
*B60G 7/00* (2006.01)
*F16C 11/06* (2006.01)
*B62D 7/16* (2006.01)
*B23P 6/00* (2006.01)

(52) U.S. Cl.
CPC .............. *B60G 7/005* (2013.01); *B23P 6/00* (2013.01); *B62D 7/166* (2013.01); *F16C 11/0604* (2013.01); *B60G 2204/416* (2013.01)

(58) Field of Classification Search
CPC .............................. B60G 7/005; B62D 7/166
See application file for complete search history.

(56) References Cited

U.S. PATENT DOCUMENTS

| | | | | |
|---|---|---|---|---|
| 3,103,377 A | * | 9/1963 | Scheublein, Jr. | ... F16C 11/0666 403/77 |
| 3,424,419 A | * | 1/1969 | Siegel | .................... A45D 44/14 416/246 |
| 3,524,664 A | * | 8/1970 | Scheublein, Jr. | ... F16C 11/0647 403/140 |
| 4,568,216 A | * | 2/1986 | Mizusawa | ........... F16C 11/0657 403/143 |
| 5,839,845 A | * | 11/1998 | Kincaid | ............. F16C 11/0647 403/135 |
| 5,885,022 A | * | 3/1999 | Maughan | ............ F16C 11/0642 403/135 |
| 9,409,598 B2 | * | 8/2016 | Giorgi | ................ F16C 11/0695 |

* cited by examiner

*Primary Examiner* — Daniel J Wiley
(74) *Attorney, Agent, or Firm* — Woodard, Emhardt, Henry, Reeves & Wagner, LLP (57) ABSTRACT

A ball joint assembly includes a stud and a two-piece cup. The stud has a shank that is connectable to a first vehicle suspension component, and a ball end. The cup is (indirectly) connectable to a second vehicle suspension component, and that holds the ball within. A locking plate prevents the two pieces of the cup from unthreading, and allows the joint to be adjusted as the friction surfaces wear.

12 Claims, 9 Drawing Sheets

BALL JOINT

REFERENCE TO RELATED APPLICATIONS

This application claims the benefit of U.S. Provisional Application Patent Application No. 63/269,360, filed Mar. 15, 2022, the entire contents of which are hereby incorporated herein by reference.

BACKGROUND

Ball joints are commonly used in motor vehicle suspensions and are spherical bearings that connect the control arms to the steering knuckles. They are used on virtually every wheeled vehicle, but for vehicles subject to heavy-duty off-road use, the ball joints, and particularly the upper ball joints, face extreme wear conditions. Accordingly, the stock parts historically provided by even the high-end all-terrain vehicle (ATV) and utility task vehicle (UTV) manufacturers are not durable enough for extreme racing enthusiasts.

Disclosed is a heavy-duty ball joint that provides superior durability and performance in extreme off-road racing environments.

SUMMARY

A ball joint assembly may include a stud member connectable to a first vehicle suspension component and a cup member connectable to a second vehicle suspension component. The stud member may include a shaft portion defining a longitudinal axis, and a ball portion extending longitudinally from one end of the stud. The cup member may include a cup base and a cup cap, which cooperate with the stud member to allow the stud ball to rotate within the cup without translation. The cup base may include a hemispherical surface and threads adapted to mate with the threads of the cup cap. The cup cap may include a hemispherical surface and threads adapted to mate with the threads of the cup base so that the two hemispherical surfaces are pulled together to substantially surround the stud ball and hold it firmly in position. The cup cap may include an upper portion having an outer surface with a first shape. He assembly may further include a locking nut having interior threads adapted to mate with the exterior threads of the cup base, and having an inner surface with a second surface shape. The assembly may further include a locking plate having an inner surface that mates with the outer surface of the cup cap to prevent the cup cap from unthreading from the cup base when the locking plate is prevented from rotating with respect to the cup base, and having an outer surface that mates with the inner surface of the locking nut to prevent the locking plate from rotating with respect to the locking nut when the locking nut is prevented from rotating with respect to the cup base.

DETAILED DESCRIPTION

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, the ball joint assembly may comprise:
a) a stud connectable to a first vehicle suspension component and comprising:
   i) a shaft defining a longitudinal axis, and
   ii) a ball extending longitudinally from one end of the stud;
b) a cup connectable to a second vehicle suspension component and adapted to cooperate with the ball to allow the ball to rotate within the cup, said cup member including an outer surface extending away from the stud member and having a first surface shape;
c) a cup comprising a threaded base member and a threaded top nut member, the threaded base member being adapted to cooperate with the threaded top nut member to secure the stud member and the cup member therebetween, said threaded top nut member including an inner surface having a second surface shape; and
d) a locking plate having an inner surface that mates with the outer surface of the cup member to prevent the cup member from rotating with respect to the locking plate when the locking plate is secure in place, and having an outer surface that mates with the inner surface of the top nut member to prevent the locking plate from rotating within the cup when the threaded top nut member secures the stud member and the cup member together.

Alternatively or additionally the ball joint assembly may comprise:
1) a "stud" having a shank end that is connectable to a first vehicle suspension component, and a ball end;
2) a "cup" that is (indirectly) connectable to a second vehicle suspension component, and that holds the ball within;
3) a cup to contain and support the stud and the cup; and
4) a locking plate.

The shank may rotate within the cup, allowing the first vehicle suspension component to rotate with respect to the second vehicle suspension component. The locking plate limits the movement of the cup within the cup.

The stud member comprises a stud ball and a stud shank extending from the ball. This arrangement defines a longitudinal axis extending the length of the stud, designated herein as the z-axis. In three-dimensional space, two other axes, designed as the x-axis and the y-axis, are defined at right angles to the z-axis and to each other. The ball is preferably free to rotate, at least to some degree, in the cup around any of these three axes. Preferably, the ball is preferably free to rotate at least 15° in the cup around any of these three axes.

The cup may comprise two portions:
1) a lower portion forming a lower cup base for holding and supporting the ball; and
2) an upper portion forming an upper cup cap for holding and supporting the cup. The upper portion of the cup is connectable to the vehicle suspension component, thus indirectly connecting the cup to the vehicle suspension component.

The stud is positioned in the cup base, and the cup is positioned over the stud. The cup is screwed into the cup base, with the (outer) threads of the cup threading onto the inner threads of the cup. This holds the stud between the cup base and the cup. The upper cup member (called the top nut) is screwed onto the cup base (with the (inner) threads of the top nut engaging the outer threads of the cup), locking the cup between the cup and the top nut. The locking plate is positioned over the shaped end of the cup that extends outward through the top nut, and is positioned to be held in place by the shaped opening in the top wall of the top nut. The retained clip holds the locking plate in place.

The assembly is described herein primarily in the context of an upper ball joint, in which the stud shank extends downward and is connectable with the steering knuckle or other suspension component of the vehicle, while the ball end of the assembly extends upward and is connectable with the upper A-arm or other suspension component. The assembly may also be used in the context of a lower ball joint, with the stud shank extending up and connectable with the steering knuckle or other suspension component of the vehicle, and the ball end of the assembly extending downward and connectable with the lower A-arm or other suspension component.

The ball joint assembly may use a locking plate to retain adjustment by engaging both the outer cup/nut and seat, without using threaded fasteners to do that. The locking plate could interface with a number of different "shapes" of those elements, with the shape of the inside or the outside of the locking plate mating (but not necessarily matching) with the shape of the corresponding element.

The assembly is illustrated and described herein in the context of a cup having a hex-shaped upper end, and similarly with the shaped opening in the top wall of the top nut having a hex shape. It is to be appreciated that other shapes may be used for either or both places, with the locking plate having a corresponding and mating shape that allows the locking plate to be held in place without rotating while the ball joint is being used.

The shape of the shaped end of the cup cap may be a polygon, and the shape of the shaped inner wall of the locking plate may be adapted to receive that polygon in a plurality of positions, with the number of positions being an integral multiple of the number of sides of the polygon used as the shaped end of the cup. For example, if the shaped end of the cup cap is a hexagon, the shaped inner wall of the locking plate may have twelve angled portions to accept the hexagonal shaped end of the cup cap in any of twelve positions. This allows the locking plate to mate with the shaped end of the cup cap in twice as many positions as would be available if both the shaped end of the cup cap and the inner wall of the locking plate were hexagonal shaped, facilitating fine adjustment of the assembly.

The assembly prevents the cup cap of the ball joint assembly from unthreading from the cup base without using or requiring set screws or other fasteners to restrain the locking plate.

Further as to the assembly:
1) the inner wall of the cup base member may be threaded to receive the correspondingly threaded outer wall of the cup cap member;
2) the outer wall of the cup base member may be threaded to receive the correspondingly threaded inner wall of the upper cup/top nut;
3) the outer wall of the cup member may thread onto the inner wall of the cup base member;
4) the inner wall of the upper cup/top nut member may thread onto outer wall of the cup base member;
5) the inner wall of the upper portion of upper cup/top nut member may be adapted to connect with a suspension component.

More particularly describing the locking plate, the inner wall of the locking plate mates to the shaped end of the cup member. This keeps the cup from rotating when locking plate is held in place. The outer shaped wall of the locking plate mates to the shaped wall of top nut opening. This keeps the locking plate from rotating when top nut is held in place.

In operation, the stud is positioned in the cup base so that the stud shank extends through and from the bottom of the cup base. The exposed portion of the stud shank is connectible to a first vehicle suspension component, such as a spindle or a portal box. The lower portion of the stud ball is held by the hemispherical surface of the cup base. When the cup cap is screwed into the cup base, the hemispherical surface of the cup cap tightens down around the upper portion of the stud ball to substantially surround the stud ball and hold it firmly in position. When the cup cap is properly tightened, the stud ball is held securely but is free to move as necessary for proper functioning of the joint. Most preferably, the stud ball is held against translational movement in the cup, thus reducing wear of the cup and ball surfaces.

It is to be appreciated that the hemispherical surfaces of the cup base and the cup cap substantially surround the stud ball when the cap is tightened to the base. Although the hemispherical surfaces do not surround the stud ball where the stud shank is present, and although the hemispherical surfaces may not surround the stud ball where grease is provided through a grease opening, the stud ball is otherwise substantially surrounded to facilitate a secure connection between the cup and the ball. This allows the stud ball to rotate within the cup without translation.

The locking plate is installed over the shaped end of the cup cap, and a locking nut is screwed over the cup cap to hold the locking plate in position. When held between the cup cap and the locking nut, the locking plate prevents the cup cap from loosening. The cup is attached to a second suspension component, such as a vehicle A-arm. Thus, the joint facilitates connection of the two suspension components.

As described herein and as shown in the relevant Figures, the locking plate has an inner surface that mates with the outer surface of the cup cap to prevent the cup member from rotating with respect to the locking plate when the locking plate is secure in place. The locking plate also has an outer surface that mates with the inner surface of the top nut member to prevent the locking plate from rotating when the threaded top nut member secures the stud member and the cup member together.

As the joint is used over time under harsh conditions, the surfaces of the ball and the cup may wear, causing the ball to become looser in the cup. If this happens, it may be desirable to tighten the cup cap slightly so that the ball may again be held in its proper position with the appropriate tightness. To do that, the locking nut is removed and the locking plate is removed from the cup cap. This allows the cup cap to be tightened or loosened with respect to the cup base. The cup cap may then be tightened as necessary. After tightening the cup cap, the locking plate and locking nut are re-installed over the cup cap, and the joint is re-installed on the vehicle. The interaction between the locking plate and the cup base prevents the cup cap from loosening from the cup base unless the set screws are loosened.

It can be seen from the above that one aspect of the present invention provides a ball joint assembly, comprising:
  a) a stud member connectable to a first vehicle suspension component and comprising: i) a shaft portion defining a longitudinal axis, and ii) a ball portion extending longitudinally from one end of the stud;
  b) a cup member connectable to a second vehicle suspension component and adapted to cooperate with the stud member to allow the stud ball to rotate within the cup without translation, the cup member including a cup base and a cup cap,
    wherein the cup base includes a first hemispherical surface and interior threads, and
    wherein the cup cap includes a second hemispherical surface and exterior threads adapted to mate with the interior threads of the cup base, with the first and second hemispherical surfaces being adapted to cooperate to hold the stud ball therebetween when the cup cap is threaded into the cup base;
  c) a locking assembly adapted to connect with the cup base and with the cup cap to prevent the cup cap from unthreading from the cup base, and thus to hold the stud ball in the cup without translation.

In a further aspect of the invention there is provided a method of maintaining a ball joint on a vehicle. The method may comprise:
  a) providing a ball joint comprising:
    i) a stud member connectable to a first vehicle suspension component and comprising: a) a shaft portion defining a longitudinal axis, and b) a ball portion extending longitudinally from one end of the stud;
    ii) a cup member connectable to a second vehicle suspension component and adapted to cooperate with the stud member to allow the stud ball to rotate within the cup without translation, the cup member including a cup base and a cup cap,
    wherein the cup base includes a first spherical surface and interior threads, and the cup cap includes a second spherical surface and exterior threads adapted to mate with the interior threads of the cup base, with the first and second spherical surfaces being adapted to cooperate to hold the stud ball therebetween when the cup cap is threaded into the cup base;
    wherein the cup base includes upwardly-extending castle teeth; and
      iii) one or more threaded fasteners adapted to interlock with the castle teeth to prevent the cup cap from unthreading from the cup base, and thus to lock the ball into position in the socket;
  b) tightening the cup base and the cup cap around the stud ball to secure the ball in the cup in a manner effective to allow the ball to move rotationally in the cup but not to move translationally, and locking the cup cap in position by tightening the set screws to block the castle teeth from rotational movement;
  c) attaching the stud and the cup to separate vehicle members and operating the vehicle until the connection between the ball and the cup has loosened enough to allow translational movement of the ball in the cup;
  d) loosening the set screws to unblock the castle teeth from rotational movement, and subsequently retightening the cup base and the cup cap around the stud ball to resecure the ball in the cup in a manner effective to allow the ball to move rotationally in the cup but not to move translationally, and subsequently relocking the cup cap in position by retightening the set screws to block the castle teeth from rotational movement.

Figure 1:
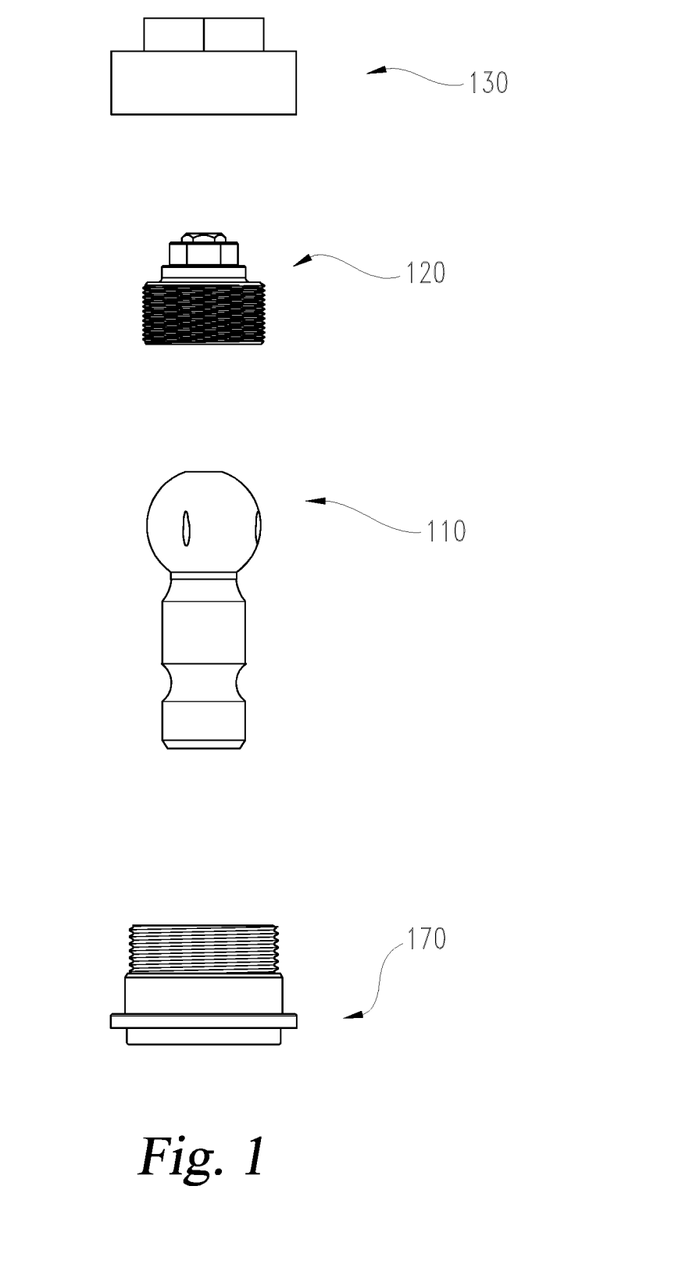
FIG. 1 is an exploded view of one embodiment of the ball joint assembly of the present invention.

Referring now to the drawings, FIG. 1 is an exploded perspective view of one embodiment of the disclosed ball joint assembly. The ball joint assembly comprises ball joint stud member 110, cup cap 120, locking nut 130, and cup base 170.

Figure 2:
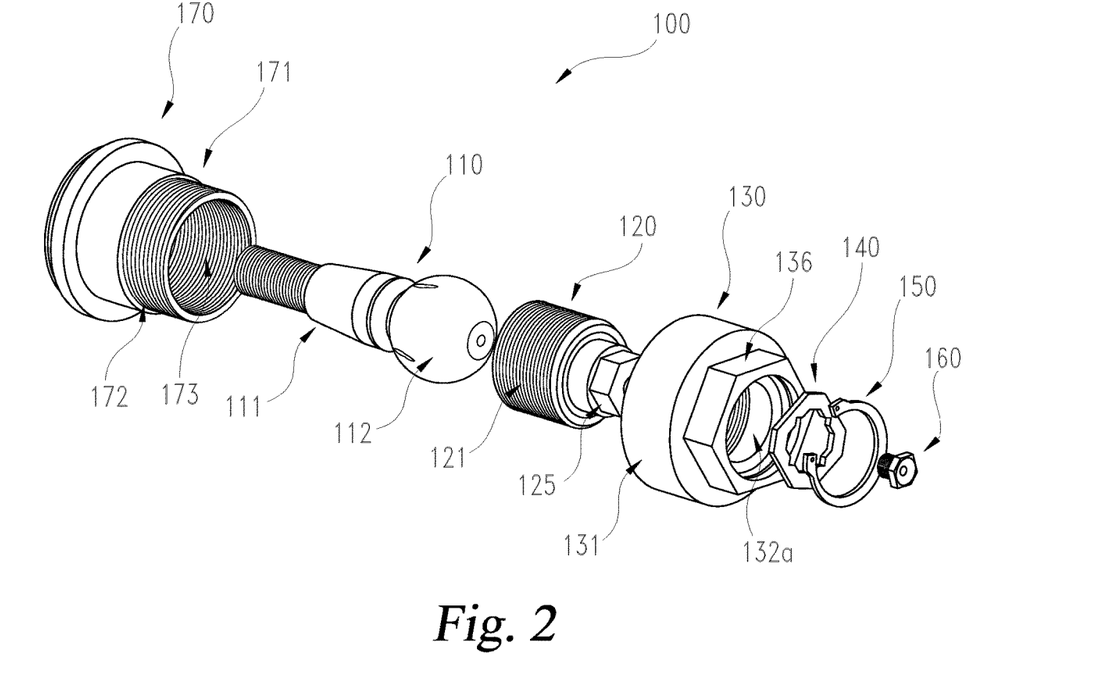
FIG. 2 is an exploded view of one embodiment of the ball joint assembly of the present invention.

FIG. 2 is another exploded perspective view of one embodiment of the disclosed ball joint assembly. Ball joint assembly 100 comprises ball joint stud member 110, cup cap 120, locking nut 130, locking plate 140, retaining clip 150, grease zerk 160 and cup base member 170. Cup base member 170 includes cup base wall 171 having threads 172 on the outside and threads 173 on the inside of the wall.

Figure 3:
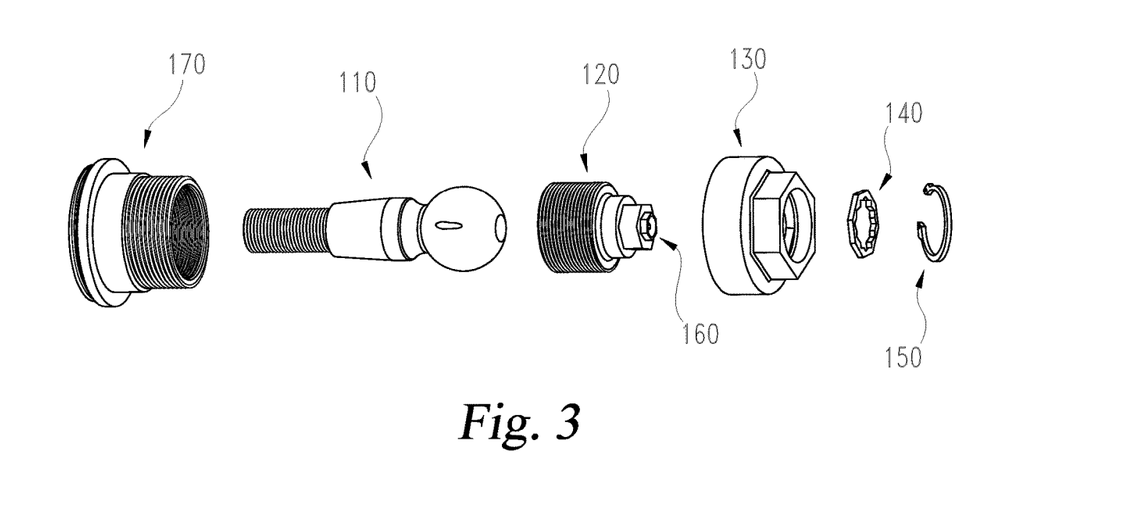
FIG. 3 is another exploded perspective view the ball joint assembly of FIG. 2.

FIG. 3 is another exploded perspective view of one embodiment of the disclosed ball joint assembly. Ball joint assembly 100 comprises ball joint stud member 110, cup cap member 120, locking nut 130, locking plate 140, retaining clip 150, grease zerk 160 and cup base member 170.

Figure 4:
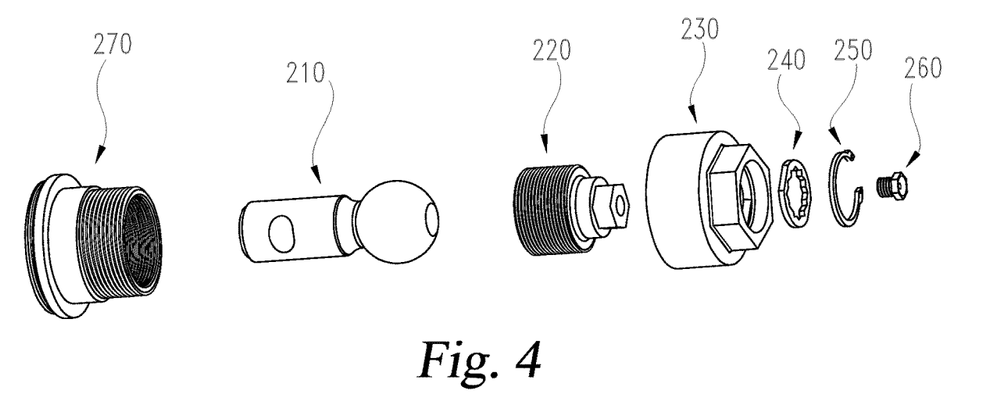
FIG. 4 is an exploded view of another embodiment of the ball joint assembly of the present invention.

FIG. 4 is an exploded perspective view of another embodiment of the disclosed ball joint assembly. The illustrated ball joint assembly comprises ball joint stud member 210, cup cap member 220, locking nut 230, locking plate 240, retaining clip 250 and grease zerk 260.

Figure 5:
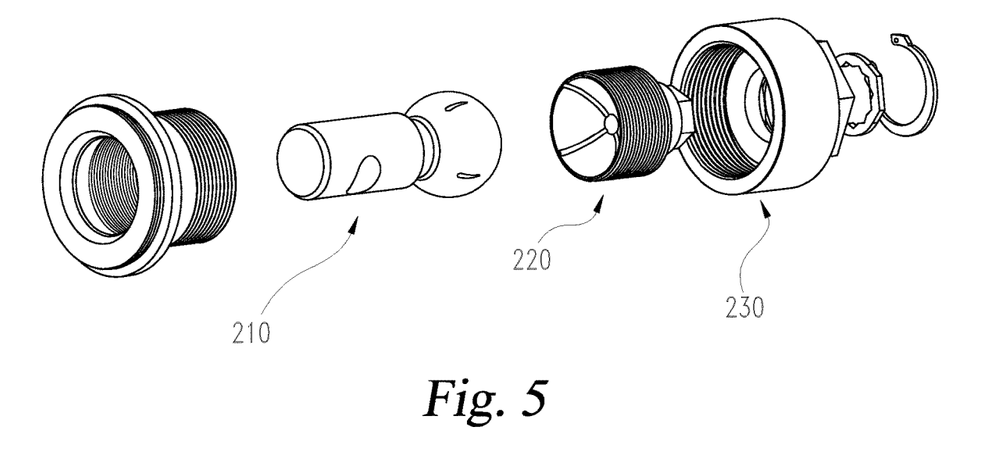
FIG. 5 is another exploded perspective view the ball joint assembly of FIG. 4.

FIG. 5 is another exploded perspective view of one embodiment of the disclosed ball joint assembly. The illustrated ball joint assembly comprises ball joint stud member 210, cup cap member 220, and locking nut 230.

Figure 6:
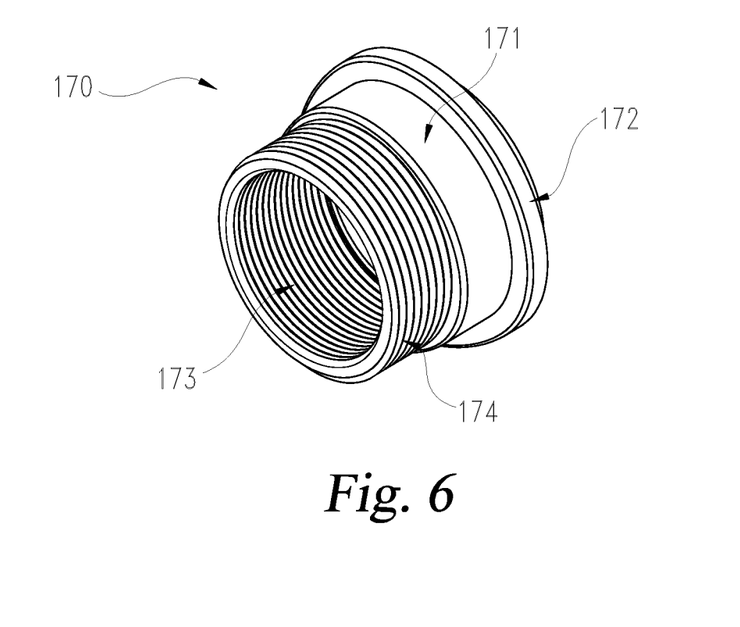
FIG. 6 is a perspective view of the cup base of one embodiment of the ball joint assembly of the present invention.

FIG. 6 is a perspective view of a cup base 170 that may be used in the disclosed ball joint assembly. The illustrated cup base member 170 includes a wall 171 extending from a lower base end 172, with wall 171 having an inside threaded portion 173 and an outside threaded portion 174.

Figure 7:
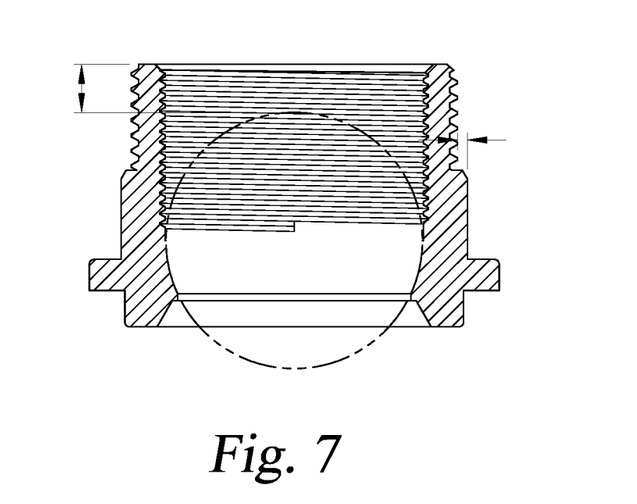
FIG. 7 is a section view of the cup base of FIG. 6.

FIG. 7 is a section view of cup base 170, showing the stud ball (in phantom) positioned in the cup base.

Figure 8:
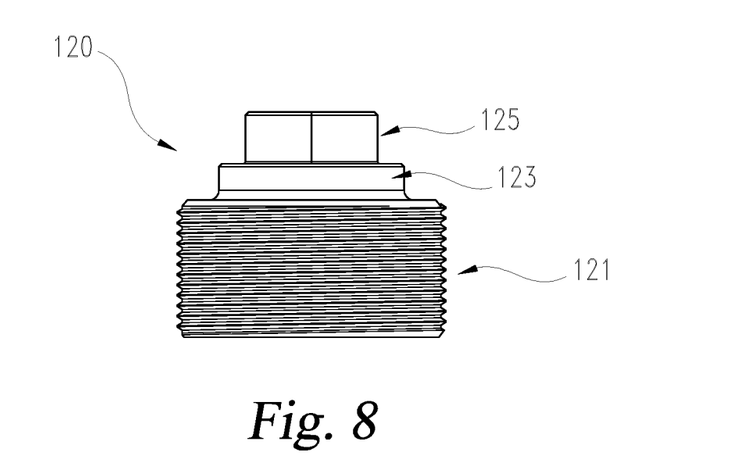
FIG. 8 is a side elevational view of a cup cap that may be used in the ball joint assembly of the present invention.

FIG. 8 shows an embodiment of the cup cap of the disclosed ball joint assembly. Cup member 120 includes a threaded wall 121, an upper portion 123, and a shaped end 125. In the illustrated embodiment, shaped end 125 of the cup cap has a hexagonal shape.

Figure 9:
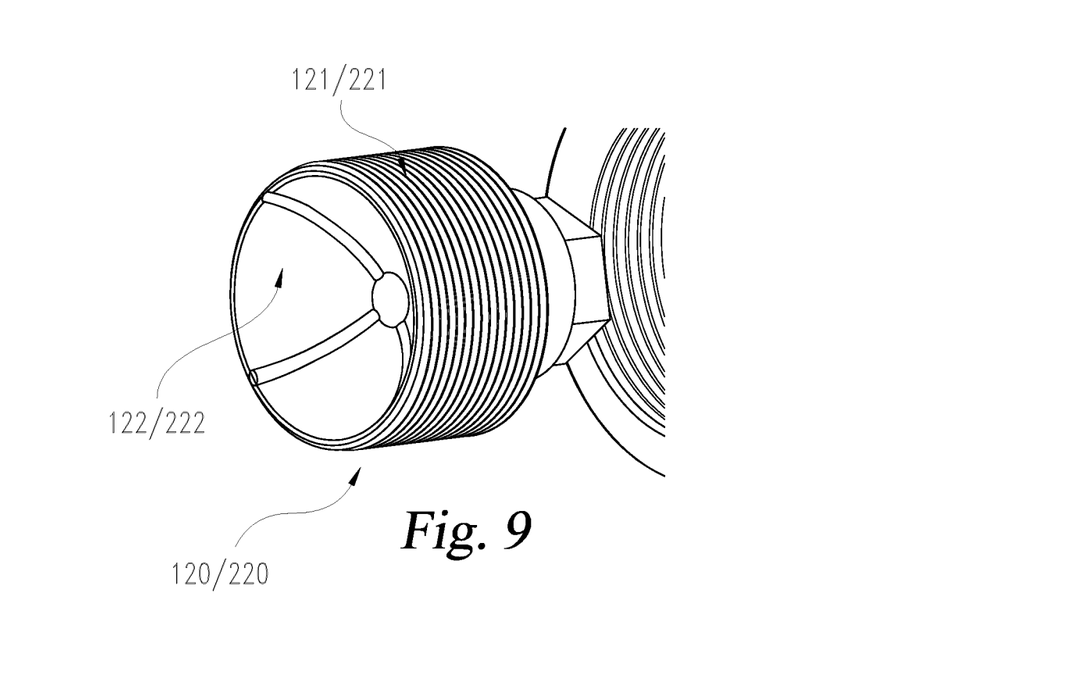
FIG. 9 is a perspective view of a cup cap with threads and the interior hemispheric surface being indicated.

FIG. 9 shows a view of a cup cap 120/220 with threads 121/222 and hemispheric surface 122/222 being indicated.

Figure 10:
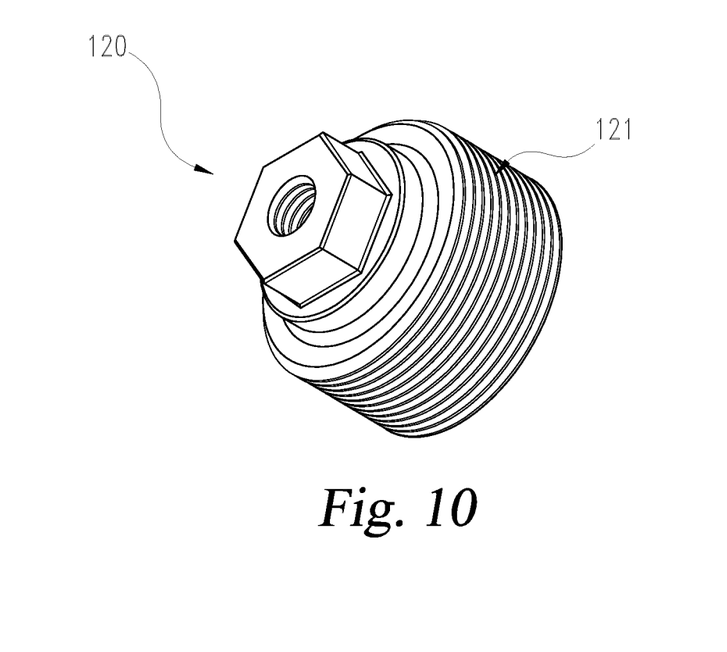
FIG. 10 is a perspective view of a cup cap that may be used in the ball joint assembly of the present invention.

FIG. 10 shows another view of cup cap 120.

Figure 11:
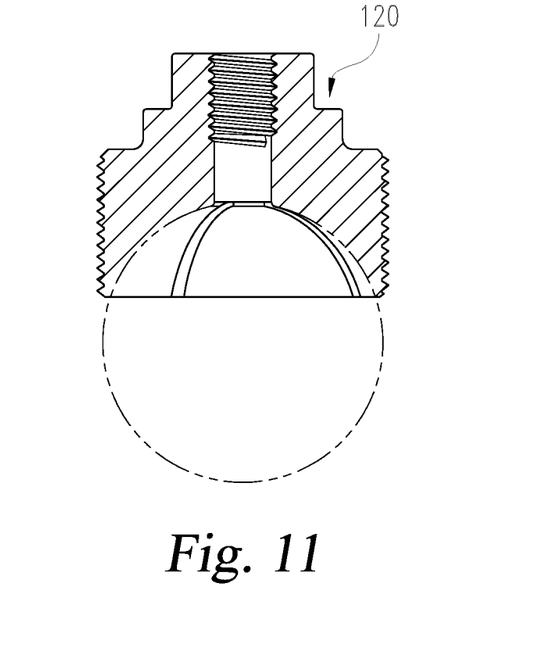
FIG. 11 is a section view of a cup cap that may be used in the ball joint assembly of the present invention.

FIG. 11 shows a section view of cup cap 120, with stud ball 112 being shown in phantom.

Figure 12:
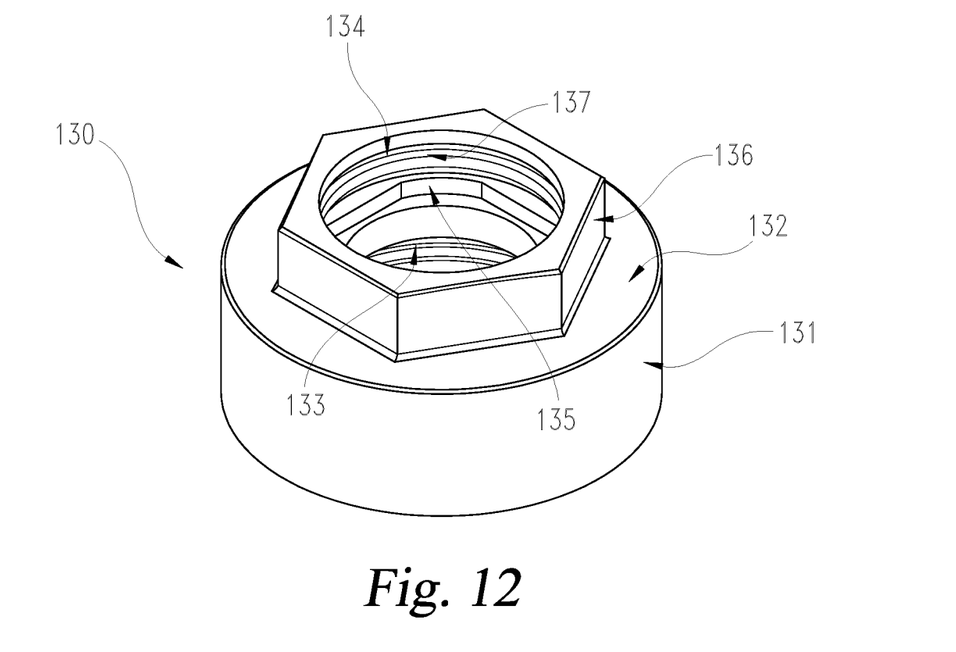
FIG. 12 shows one embodiment of the upper cap (top nut) of the ball joint assembly of the present invention.

FIG. 12 shows one embodiment of locking nut of the disclosed ball joint assembly. Locking nut 130 comprises a side wall 131, a top wall 132, outer side wall threads 133, an opening 134 in top wall 132, a shaped inner wall 135 near or at the opening, and a shaped outer wall 136 having an internally threaded side wall 137. Shaped wall inner 135 has a shape that corresponds to (but is not necessarily identical to) the outer wall shape of the locking plate, and is effective to prevent the locking plate from rotating in the top nut when positioned therein.

Figure 13:
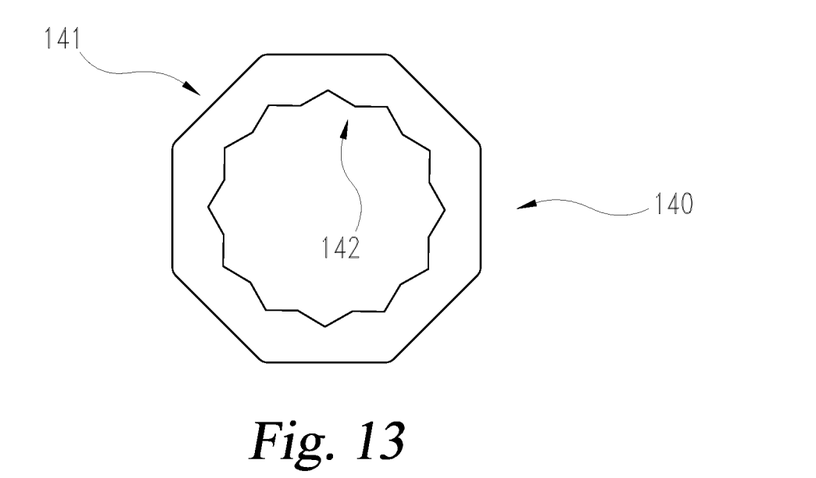
FIG. 13 shows one embodiment of a locking plate member that may be used in the ball joint assembly of the present invention.

FIG. 13 shows one embodiment of the locking plate member of the disclosed ball joint assembly. Locking plate 140 has a shaped outer wall 141 and a shaped inner wall 142. Shaped outer wall 141 has a shape that corresponds to (but is not necessarily identical to) the shape of the shaped inner wall 135 of the locking nut, and is effective to prevent the locking plate from rotating in the top nut when positioned therein. Similarly, shaped inner wall 142 has a shape that corresponds to (but is not necessarily identical to) the shape of shaped end 125 of cup member 120, and is effective to prevent cup member 120 from rotating in the locking plate, and also with respect to the top nut, when the assembly is locked together.

Figure 14:
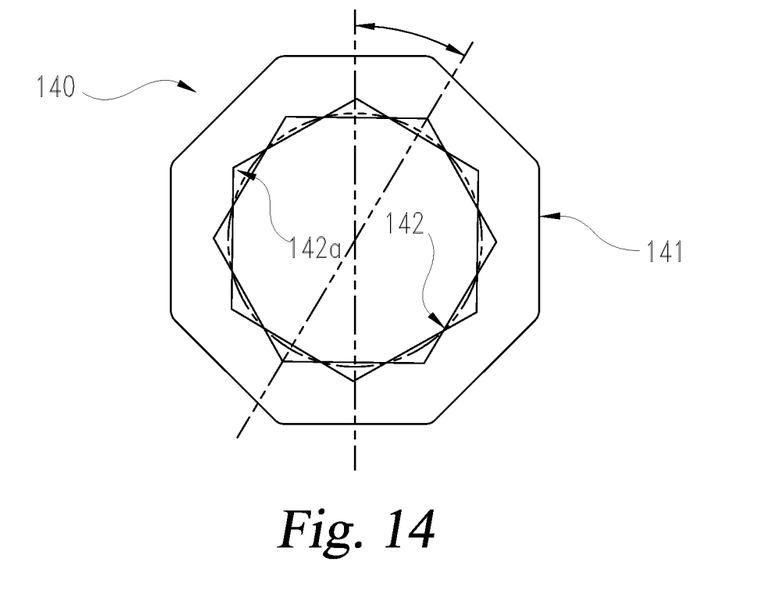
FIG. 14 is another view of the locking plate member of FIG. 13.

FIG. 14 shows one embodiment of the locking plate member of the disclosed ball joint assembly. Locking plate 140 has a shaped outer wall 141 and a shaped inner wall 142. The shape of the shaped inner wall is selected to "mate" with the shape of the shaped end of the cup cap, so that the locking plate may block the cup cap from rotating within the locking plate when the two parts are engaged. Accordingly, when the shaped end of the cup is a polygon, the shape of the shaped inner wall of the locking plate is selected to accept that shape and prevent it from rotating within the locking plate. Most preferably, the shape of the shaped inner wall of the locking plate as a number of indents that is an integral multiple of the number of corners of the polygon used as the shaped end of the cup. For example, since the shaped end of the cup is a hexagon, the shaped inner wall of the illustrated locking plate has twelve angled portions 142*a* to allow the locking plate to accept the hexagonal shaped end of the cup in any of twelve positions. This allows the locking plate to mate with the shaped end of the cup in twice as many positions as would be available if both the shaped end of the cup and the inner wall of the locking plate were hexagonal shaped, facilitating fine adjustment of the assembly.

Figure 15:
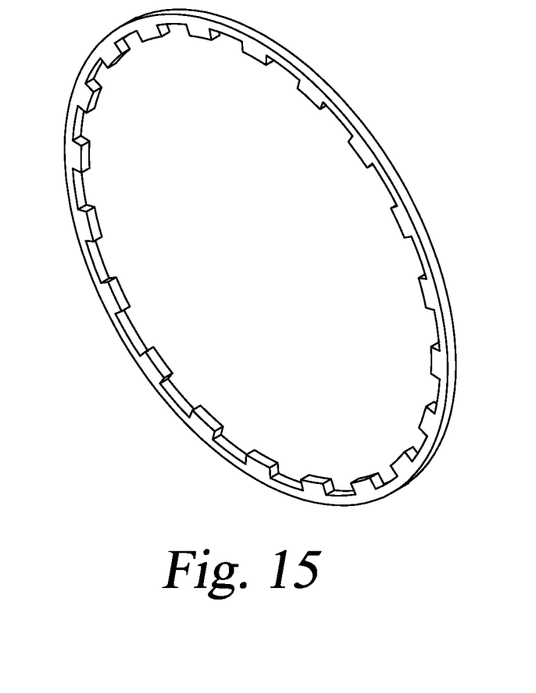
FIG. 15 shows another embodiment of a locking plate member that may be used in the ball joint assembly of the present invention.

FIG. 15 shows an alternative embodiment of a locking plate member that may be used with the disclosed ball joint assembly.

Figure 16:
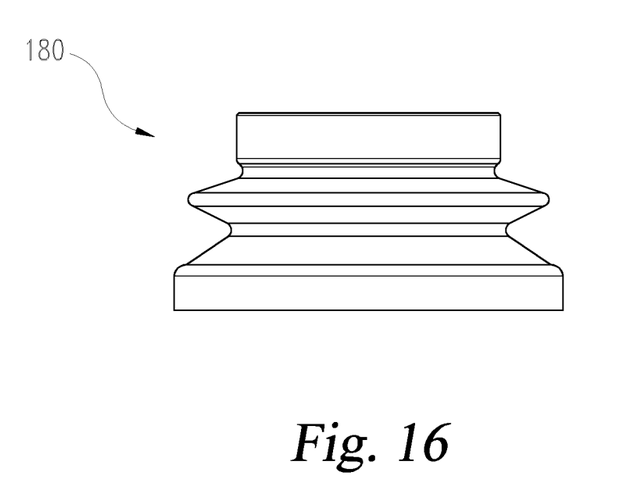
FIG. 16 shows one embodiment of a boot that may be used with the ball joint assembly of the present invention.

FIG. 16 shows one embodiment of a boot 180 that may be used with the disclosed ball joint assembly.

While the invention has been illustrated and described in detail in the drawings and foregoing description, the same are to be considered as illustrative and not restrictive; it being understood that only certain preferred embodiments have been shown and described and that all changes and modifications that come within the spirit of the invention are desired to be protected. In addition, it is to be appreciated that the present invention may comprise or consist essentially of any or all of the described or illustrated elements and/or features. For example, the present invention includes devices and methods comprising any or all of the elements and/or features described or illustrated in specification or drawings, and the present invention includes devices and methods consisting essentially of any or all of the elements and/or features illustrated in the specification or drawings. Additionally, any or all of the elements and/or features and/or embodiments disclosed herein may be combined with any or all of the other elements and/or features and/or embodiments disclosed herein to provide a device or method that comprises or consists essentially of such elements and/or features.

For clarity, when the grammatical device "and/or" (such as in "A and/or B") is used in this disclosure, it is intended to mean A alone, or B alone, or both A and B.

The invention claimed is:

1. A ball joint assembly for use with first and second vehicle suspension components, wherein the ball joint assembly comprises:
   a stud member connectable to the first vehicle suspension component, wherein the stud member comprises:
      a shaft portion defining a longitudinal axis; and
      a ball portion extending longitudinally from one end of the stud;
   a cup member connectable to the second vehicle suspension component, wherein the cup member is adapted to cooperate with said stud member to allow the ball portion of the stud to rotate within the cup without translation, wherein the cup member comprises:
      a cup base defining a lower hemispherical surface and first cup base threads; and
      a cup cap defining an upper hemispherical surface and cup cap threads adapted to mate with the first cup base threads, wherein the cup cap includes an upper portion having an outer surface with a first shape; and
   a locking assembly adapted to selectively couple with the cup base and the cup cap to block the cup cap from rotating relative to the cup base thereby holding the stud ball in the cup member without translation;
   wherein the cup base further defines second cup base threads and wherein the locking assembly is threadingly engaged with the second cup base threads thereby coupling the locking assembly to the cup base.

2. The ball joint assembly of claim 1, wherein the locking assembly comprises:
   a locking nut defining an inner surface with a second surface shape, wherein the locking nut is selectively coupled to the cup base; and
   a locking plate defining an inner surface that selectively mates with the first shape of the cup cap such that the locking plate and the cup cap are rotationally coupled, and wherein the locking plate defines an outer surface that selectively mates with the second surface shape of the locking nut such that the locking plate and the locking nut are rotationally coupled and thereby blocking the cup cap from rotating relative to the cup base when the locking plate is mated with the cup cap and the locking nut.

3. The ball joint assembly of claim 2, wherein the locking plate is movable in a longitudinal direction relative to the locking nut.

4. The ball joint assembly of claim 3, further comprising a retaining member that selectively secures the locking plate from moving in the longitudinal direction relative to the locking nut.

5. The ball joint assembly of claim 4, wherein the retaining member is a retaining clip.

6. The ball joint assembly of claim 2, wherein the first shape of the cup cap is a polygon with a number of corners.

7. The ball joint assembly of claim 6, wherein the inner surface of the locking plate defines a number of indents that is an integral multiple of the number of corners of the polygon of the first shape of the cup cap.

8. The ball joint assembly of claim 6, wherein the inner surface of the locking plate defines a number of indents that is twice the number of corners of the polygon of the first shape of the cup cap.

9. A method of maintaining a vehicle having the ball joint assembly of claim 2, wherein the stud member of claim 2 is connected to a first vehicle suspension component and the cup member of claim 2 is connected to a second vehicle suspension component, the method comprising:

operating the vehicle until the connection between the ball portion of the stud member and the cup member has loosened enough to allow translational movement of the ball portion in the cup member;

removing the locking plate from mated engagement with the cup cap and the locking nut;

tightening the cup base relative to the cup cap until the ball cannot move translationally but can move rotationally relative to the cup base; and after tightening the cup base relative to the cup cap; mating the locking plate with the cup cap and the locking nut thereby restraining rotation of the cup base relative to the cup cap.

10. The ball joint assembly of claim 1, wherein the first cup base threads are internal threads and wherein the second cup base threads are external threads.

11. The ball joint assembly of claim 1, wherein threadingly mating the cup cap to the cup base pulls together the upper and lower hemispherical surfaces to substantially surround the stud ball and secure the stud ball in position without translation.

12. The ball joint assembly of claim 11, wherein, when the upper and lower hemispherical surfaces substantially surround the stud ball, the stud ball can rotate relative to the cup base at least 15 degrees around any axis.

* * * * *